United States Patent
Wibaux et al.

(10) Patent No.: US 9,835,743 B2
(45) Date of Patent: Dec. 5, 2017

(54) SYSTEM AND METHOD FOR SEISMIC PATTERN RECOGNITION

(75) Inventors: Sebastien Wibaux, Gouesnou (FR); Vincente H. Guis, Marseilles (FR)

(73) Assignee: MAGNITUDE SPAS, Sainte Tulle (FR)

( * ) Notice: Subject to any disclaimer, the term of this patent is extended or adjusted under 35 U.S.C. 154(b) by 1574 days.

(21) Appl. No.: 11/945,570

(22) Filed: Nov. 27, 2007

(65) Prior Publication Data

US 2008/0123469 A1 May 29, 2008

Related U.S. Application Data

(60) Provisional application No. 60/867,426, filed on Nov. 28, 2006.

(51) Int. Cl.
*G01V 1/06* (2006.01)
*G01V 1/00* (2006.01)

(52) U.S. Cl.
CPC ........ *G01V 1/008* (2013.01); *G01V 2210/123* (2013.01)

(58) Field of Classification Search
USPC ........ 367/21, 38, 40, 43, 47, 56, 57; 702/16, 702/17
See application file for complete search history.

(56) References Cited

U.S. PATENT DOCUMENTS

| | | | |
|---|---|---|---|
| 3,504,164 A * | 3/1970 | Lachenmayer et al. | 702/73 |
| 3,629,796 A * | 12/1971 | Brownscombe | G01V 1/003 346/33 C |
| 3,691,549 A * | 9/1972 | Wilson | G01V 1/001 340/527 |
| 3,714,621 A * | 1/1973 | Waters | 367/51 |
| 3,893,066 A * | 7/1975 | Saunders | G01V 1/16 367/43 |
| 4,203,161 A * | 5/1980 | Johnson et al. | 367/40 |
| 4,229,810 A * | 10/1980 | Thompson | 367/68 |
| 4,314,347 A * | 2/1982 | Stokely | 702/17 |
| 4,403,313 A * | 9/1983 | Garotta | 367/61 |
| 4,630,246 A * | 12/1986 | Fogler | G01V 1/00 340/522 |
| 4,751,655 A * | 6/1988 | Peacock | 702/189 |
| 5,138,582 A * | 8/1992 | Furu | G01V 1/3861 114/245 |
| 5,184,329 A * | 2/1993 | Regnault | G01V 1/04 181/110 |
| 5,309,406 A * | 5/1994 | Ongkiehong et al. | 367/73 |
| 5,574,639 A * | 11/1996 | Qian et al. | 708/300 |

(Continued)

OTHER PUBLICATIONS

James Albright, et al. "Seismic Surveillance for Monitoring Reservoir Changes". Oilfield Review. vol. 6. No. 1, Jan. 1994. pp. 4-14.
Stuart Jardine, et al. "Putting a damper on Drilling's Bad Vibrations". Oilfield Review. vol. 6. No. 1, Jan. 1995. pp. 15-20.
Les Bennett, et al. "The Source for Hydraulic Fracture Characterization". Oilfield Review. Winter 2005/2006. pp. 42-57.

(Continued)

*Primary Examiner* — James Hulka
(74) *Attorney, Agent, or Firm* — Cantor Colburn LLP

(57) ABSTRACT

A method for identifying a seismic event includes extracting a portion of a plurality of seismic data signals based on energy levels in the plurality, comparing the extracted portion to a known pattern and determining a correlation, and identifying the seismic event based on the correlation. A computer program product and devices for implementing the method are provided.

12 Claims, 7 Drawing Sheets

(56) References Cited

U.S. PATENT DOCUMENTS

| | | | | |
|---|---|---|---|---|
| 5,747,750 | A * | 5/1998 | Bailey et al. | 181/112 |
| 5,924,499 | A * | 7/1999 | Birchak et al. | 175/40 |
| 6,049,508 | A * | 4/2000 | Deflandre | 367/48 |
| 6,253,156 | B1 * | 6/2001 | Bui-Tran | G01V 1/26 702/17 |
| 6,868,038 | B2 * | 3/2005 | Leaney | 367/57 |
| 7,391,675 | B2 * | 6/2008 | Drew | 367/73 |
| 7,663,970 | B2 * | 2/2010 | Duncan et al. | 367/38 |
| 7,881,160 | B2 * | 2/2011 | Rouquette | G01V 1/005 367/189 |
| 2003/0043693 | A1 * | 3/2003 | Eastwood et al. | 367/41 |
| 2003/0144797 | A1 * | 7/2003 | Leaney | 702/14 |
| 2003/0151975 | A1 * | 8/2003 | Zhou et al. | 367/31 |
| 2003/0231548 | A1 * | 12/2003 | Gillard et al. | 367/40 |
| 2005/0122840 | A1 * | 6/2005 | Haldorsen | 367/57 |
| 2006/0062084 | A1 * | 3/2006 | Drew | 367/68 |
| 2008/0068928 | A1 * | 3/2008 | Duncan et al. | 367/73 |
| 2008/0091354 | A1 * | 4/2008 | Byerly | 702/6 |

OTHER PUBLICATIONS

Andrey Bakulin, et al. "Downhole acoustic surveillance of deepwater wells". The Leading Edge. Apr. 2008. pp. 518-531.

Hirokazu Moriy, et al. Multiplet-clustering Analysis Reveals Structural Details within Seismic Cloud at the Soultz Geothermal Field, France. Bul. Seism. Soc. Am. pp. 1-31.

Torsten Clemens, "Resrvoir Performance and Monitoring". Technology Focus. JPT. Sep. 2008. pp. 84-99.

Yves Serge Simon. "Stress and fracture characterization in a shale reservoir, North Texas, using correlation between new seismic attributes and well data". A Thesis Presented to the Faculty of the Department of Geosciences, University of Houston. pp. 1-20. Dec. 2005.

Stephen Wilson, et al. "Passive seismic makes sense for 4D reservoir monitoring". firstbreak vol. 23, Oct. 2004. pp. 59-65.

Erick Baziw, et al. "A Rao-Blackwellised type algorithm for passive seismic event detection". pp. 135-164.

Microseismic hydraulic fracture monitoring. Geospace Technologies. www.geospacetech.com. 2 pages.

* cited by examiner

SYSTEM AND METHOD FOR SEISMIC PATTERN RECOGNITION

CROSS REFERENCE TO RELATED APPLICATIONS

Under 35 U.S.C. §119(e), this application claims the benefit of U.S. Provisional Application No. 60/867,426, filed Nov. 28, 2006, the entire disclosure of which is incorporated herein by reference.

BACKGROUND OF THE INVENTION

1. Field of the Invention

The invention disclosed herein relates to geologic exploration and, in particular, to techniques for determining seismic events.

2. Description of the Related Art

Subterranean formations may be monitored using one or more seismic receivers. The receivers may be geophones placed at the surface or submerged in wells or on the ocean floor. Also, the receivers may be hydrophones placed in those same locations, but sensitive to only certain types of waves. The receivers placed in wells may be shallow (usually above the formation of interest) or deep (usually at or below the formation of interest). Seismic receivers may be sensitive to seismic waves along a certain axis or those traveling on any axis. Likewise, the receivers may be sensitive to only certain types of seismic waves, or several types. Those sensitive to certain axis of travel, called directional receivers, may be coupled with other directional receivers. For example, a directional receiver may be coupled with two other directional receivers in a set of three orthogonal receivers which collect information about the waves in three dimensions. This three-dimensional information may be rotated mathematically through the use of trigonometric functions in order to derive information as to wave travel in the x-axis, y-axis and z-axis relative to gravity. Alternatively, mathematical rotation may provide translation of the data relative to a wellbore, a cardinal direction, or any other reference point.

Microseismic monitoring concerns passively monitoring a formation for seismic events which are very small. Such events may include the seismic effects generated in a formation by fracturing, depletion, flooding, treatment, fault movement, collapse, water breakthrough, compaction or other similar subterranean interventions or effects. One of the main problems with microseismic monitoring, as with other forms of seismic monitoring, is that of noise. With microseismic events, however, the problem is emphasized because the signal strength is generally very small. This means, in turn, that a small amount of noise which would not cause any significant effect as to a regular, active seismic survey causes a significant degradation of the signal to noise ratio in the microseismic survey.

The geology of the microseismic environment is also of interest. Different geological layers are composed of different materials which transmit seismic waves at different velocities. It will be appreciated that when a source occurs in a high-velocity layer, its transmission through to a lower-velocity layer will cause attenuation, as much of the wave energy is reflected back into the high-velocity layer.

What are needed are systems and methods for identifying and determining locations of seismic events, including microseismic events, and for automatic identification of such events.

BRIEF SUMMARY OF THE INVENTION

Disclosed is a method for identifying a seismic event, the method including extracting a portion of a plurality of seismic data signals based on energy levels in the plurality, comparing the extracted portion to a known pattern and determining a correlation, and identifying the seismic event based on the correlation.

Also disclosed is a computer program product including machine readable instructions stored on machine readable media, the instructions for recognizing a pattern in microseismic data, by implementing a method including: receiving a plurality of microseismic data signals, eliminating extraneous information from each of the data signals, normalizing each of the data signals, extracting a portion of the plurality based on energy levels in the plurality, comparing the extracted portion to a known pattern and determining a correlation, and determining an arrival time of the seismic event based on the correlation.

Further, a device for locating a microseismic event is provided. The device includes at least one processor adapted for receiving seismic trace data from at least one seismic receiver and implementing a method. The method includes extracting a portion of the seismic trace data, and comparing the extracted portion to a known pattern and determining a correlation. Determining the correlation provides for identifying the seismic event.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION OF THE INVENTION

Figure 1:
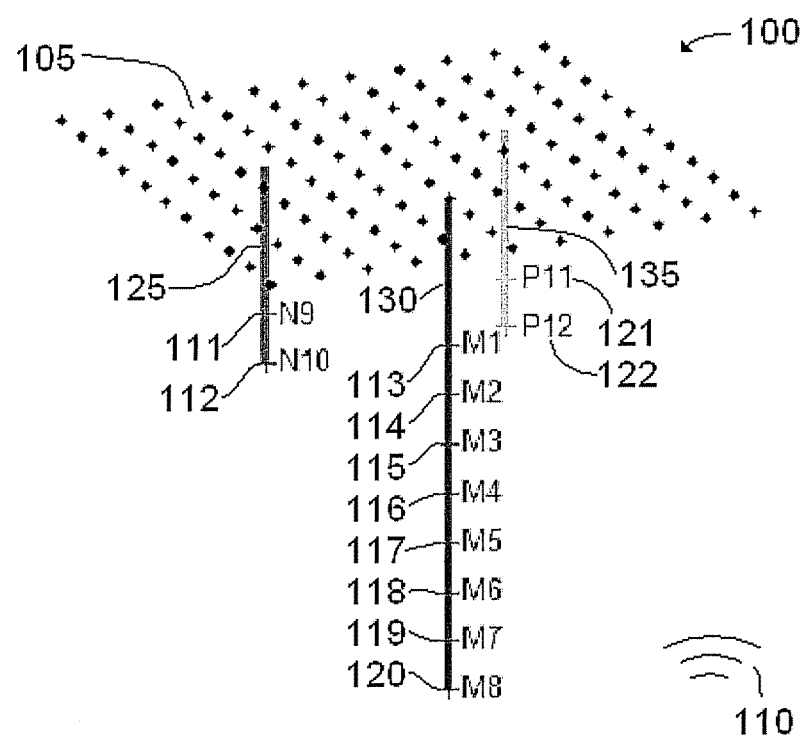
FIG. 1 depicts aspects of a seismic monitoring system.

There are provided herein systems and methods for identifying or assisting in the identification of seismic events, including microseismic events, detected using at least one receiver or a network of receivers. Also provided are systems and methods for detecting and/or identifying seismic events by comparing seismic data to selected patterns. The systems and methods provide event detection that may permit automatic identification of seismic events, and may also permit real-time or near real-time identification of seismic events. This identification may be used to facilitate or perform a picking process to identify arrival times of seismic waves and determine locations of associated seismic events.

Seismic surveys such as microseismic surveys generally include receiving data from a receiver, locating data that exceeds some threshold, and analyzing the over-threshold data in order to determine information about certain events. Data which does not meet the threshold is usually discarded or simply not recorded as noise data. Selected data is then analyzed, usually manually, in order to recognize certain known patterns. Arrival times of different waves, called "picks", may be noted on a plot of the data.

Microseismic data may be analyzed as a set, with several receivers providing data for a joint analysis. Data is collected from a receiver and related to the other data collected from other receivers in order to derive additional information about the formation. Information from a set of receivers, for example, may be analyzed to estimate the type of seismic event.

Subterranean formations are of interest for a variety of reasons. Such formations may be used for the production of hydrocarbons, the storage of hydrocarbons or other substances, mining operations or a variety of other uses. One method used to obtain information regarding subterranean formations is to use acoustic or seismic waves to interrogate the formation. Seismic waves may be generated into the formation and the resulting reflected waves received and analyzed in order to provide information about the geology of the formation. Such interrogations are referred to as active seismic surveys.

Microseismic monitoring concerns passively monitoring a formation for seismic events which are very small. In passive monitoring, the formation is not interrogated, per se, but seismic receivers are placed to receive directly any seismic waves generated by events occurring within the formation. Such events may include the seismic effects generated in a formation by fracturing, depletion, flooding, treatment, fault movement, collapse, water breakthrough, compaction or other similar subterranean interventions or effects. This additional information about these events may be very useful in determining certain interventions in order to enhance the use of the formation or provide additional safety measures in certain situation. For example, it is common in the hydrocarbon production industry to fracture or "frac" a formation. During this operation, fluid and propant is pumped down a well at high pressure in order to generate additional fracturing within a zone of the well. The propant is pumped into these fractures and maintains them after the pressure is removed. Monitoring the seismic waves generated during and immediately after a frac operation can provide critical information about the operation, such as the direction and extent of the fractures being generated.

In yet another exemplary application, microseismic monitoring may be used to provide long-term monitoring for subterranean storage facilities and formations from which hydrocarbons or water is being produced. Under certain conditions, the integrity of these formations may become compromised, causing collapse. Such collapses may pose a safety concern for those on the surface, as entire sections of ground may fall into the collapse. However, often certain characteristic small seismic waves may precede such failures, permitting remedial measures to delay the collapse and ultimately some warning of the impending collapse to allow for isolation of any dangerous areas from personnel.

Referring to FIG. 1, there are shown aspects of an exemplary embodiment of a system 100 for seismic monitoring. In one embodiment, one or more subterranean formations are monitored using one or more seismic receivers 111-122. A plurality of the seismic receivers 111-122 may form a network for monitoring subterranean formations. Each receiver 111-122 receives seismic waves 110 generated by seismic activity and generates seismic trace data representing the waves 110 and indicative of the seismic activity. In this embodiment, seismic receivers are passive seismic receivers. Each receiver 111-122 may be a geophone (as shown in FIG. 1) and/or a hydrophone placed at the surface, submerged in wells or on the ocean floor. Each receiver 111-122 may be an analog or digital receiver. Other types of receivers known now or in the future may also be used. In the embodiment shown in FIG. 1, the receivers 111-122 are submerged below a surface 105 in wellbores 125, 130 and 135. The wellbores 125, 130 and 135 extend below the surface 105 to various depths, and may extend above, into and/or through the formations. As shown in FIG. 1, the receivers 111, 112 are submerged in the wellbore 125, the receivers 113-120 are submerged in the wellbore 130, and the receivers 121, 122 are submerged in the wellbore 135. As also shown in FIG. 1, the receivers 111-122 may be submerged along their respective wellbores 125, 130, 135 at varying depths. The number and position of the receivers 111-122 are merely exemplary. Any number or configuration of receivers may be used, at various desired depths. As is known in the art, the term "wellbore" is generally synonymous with the term "well".

The receivers 111-122 may be placed in shallow wells (usually above the formation of interest), deep wells (usually at or below the formation of interest) or at the surface 105. In one embodiment, the wellbores 125 and 135 may be considered shallow wells, and the wellbore 130 may be considered a deep well. The receivers 111-122 may be sensitive to seismic waves 110 along a certain axis or those traveling on any axis. Likewise, the receivers 111-122 may be sensitive to only certain types of seismic waves 110, or several types. Those receivers 111-122 sensitive to certain axes of travel, called directional receivers 111-122, may be coupled with other directional receivers 111-122. For example, multiple directional receivers 111-122 or sensors may be coupled together in a set of three orthogonal receivers or sensors which collect information about the waves 110 in three dimensions. This three-dimensional information may be rotated mathematically through the use of trigonometric functions in order to derive information as to wave travel in the x-axis, y-axis and z-axis relative to gravity. Alternatively, mathematical rotation may provide translation of the data relative to the wellbore 125, 130, 135, a cardinal direction, or any other reference point.

Any number of receivers 111-122 may be provided. The receivers 111-122 may form a network detect the seismic signals, which may be quite large and/or dense. In one embodiment, each receiver 111-122 may be considered a receiver location, which may include a plurality of receivers and/or sensors to record data at the single location. For example, a single location may record seismic data from multiple receivers 111-122 or sensors that are sensitive to the orthogonal x-axis, y-axis and z-axis. Accordingly, three or more traces may be generated from each single location. Monitoring of an entire network, which may consist of tens or hundreds of sensing locations, may generate a large number of traces. Each of the locations represented by receivers 111-122 in FIG. 1 may house a single sensor or multiple sensors (e.g., a set of three sensors), each sensitive to a different direction (e.g., the orthogonal directions x, y, and z). Accordingly, although a "receiver" is referred to in the singular, it may include one or more actual seismic sensors. For example, as described above, a receiver may comprise three component receivers.

In one embodiment, as shown in FIG. 1, at least one set of receivers (e.g., the receivers 113-120) are located at different depths within a single surface location, i.e. a single x-y location.

In one embodiment, the receivers 111-122 may be placed within a uniform velocity model. However, in an alternative embodiment, receivers 111-122 at a variety of depths or within disparate velocity models may be used, with the data ultimately collected being corrected for such features.

In one embodiment, the receivers 111-122 are permanent sensors, cemented in place in wells without casing. In alternate embodiments, however, the receivers may be placed within cased wells, placed at the surface in a temporary manner or otherwise located in methods already well appreciated in the art.

The illustration of FIG. 1 is non-limiting and merely exemplary of one embodiment of the microseismic monitoring system 100. For example, any number of receivers 111-122 may be included in the system 100, and may be located at the surface 105 and/or submerged in wellbores such as wellbores 125, 130, 135.

The location of each receiver 111-122 may be known and recorded in advance. In one embodiment, a plurality of the receivers 111-122 may form an array, such as a symmetrical array, which may be in the form of, for example, a square grid, triangular grid or hexagonal grid of receivers 111-122. Such an arrangement may facilitate processing the results, but is not necessary. Any suitable arrangement of receivers 111-122 may be used. Different arrangements may facilitate processing along different planes and with varying numbers of receivers, and may be conducive to varying velocity models or varying geological environments. For example, a square grid at a uniform depth may increase sensitivity to waves traveling horizontally, while a set of receivers 111-122 within a single wellbore 125, 130, 135 may be more sensitive to waves traveling vertically. Accordingly, any desired configuration of the set of receivers 111-122 may be used.

Figure 2:
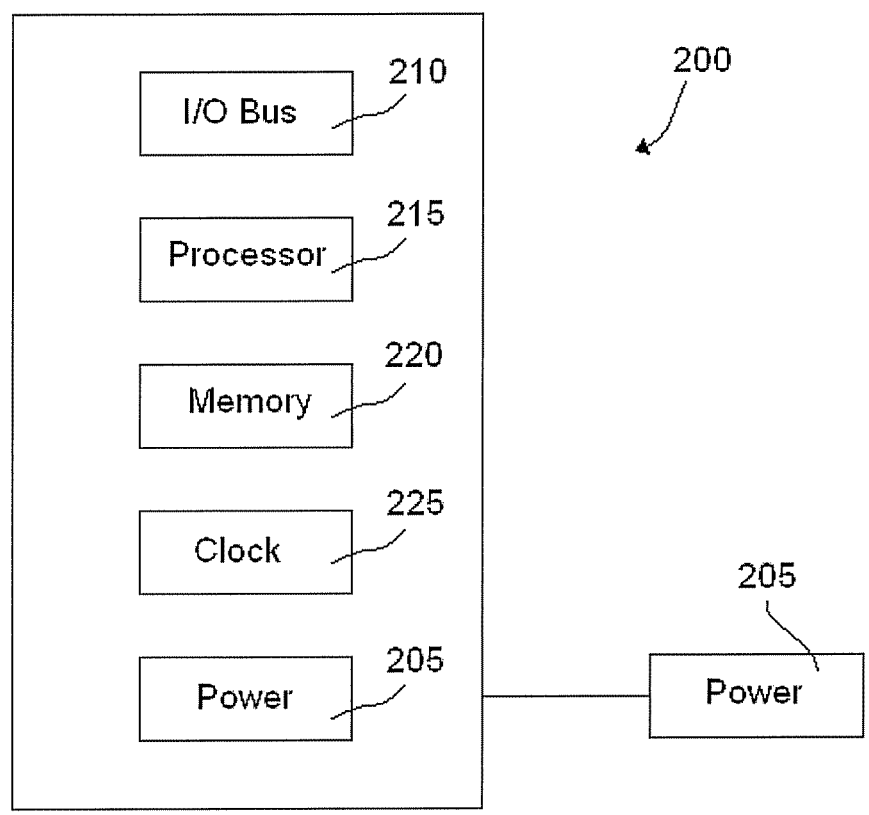
FIG. 2 depicts aspects of a collector.

Referring to FIG. 2, the plurality of receivers 111-122 may be connected to at least one least one collector, which may be a collection machine 200 or other device or system adapted to receive input information from one or more of the plurality of receivers 111-122. In one embodiment, the collector may include one or more collection machines 200 or other devices.

The collection machine 200 may include a computer system having a storage medium. In one embodiment, the collection machine 200 may include, without limitation, at least one power supply 205, an input/output bus 210, a processor 215, a memory device or system 220, a clock 225 or other time measurement device, and other components (not shown) such as an input device and an output device. The power supply 205 may be incorporated in a housing along with other components of the collection machine 200, or may be connected remotely such as by a wired connection. Other components may be included as deemed suitable, such as additional processors and/or displays for providing and/or displaying seismic data.

One or more of the receivers 111-122 may be equipped with transmission equipment to communicate ultimately to a processor, such as the processor 215 in the collection machine 200. Connections between the receivers 111-122 and the collection machine 200 may take any desired form, and different transmission media and methods may be used. Examples of connections may include wired, fiber optic and wireless connections. Further examples of connections may also include direct, indirect or networked connections between the receivers 111-122 and the collection machine 200.

The collection machine 200 and/or the processor 215 may receive seismic trace data from one or more of a plurality of the receivers 111-122. Trace data may include data regarding seismic events and data that is considered noise. Each stream of trace data, i.e., data signal, includes a plurality of data points generated by a respective receiver 111-122 during a selected duration of time or time window. The plurality of data points from a single receiver 111-122 over the selected duration of time is referred to as a "trace". These data points may also be referred to as a "trace data stream" or "seismic data signal".

Figure 3:
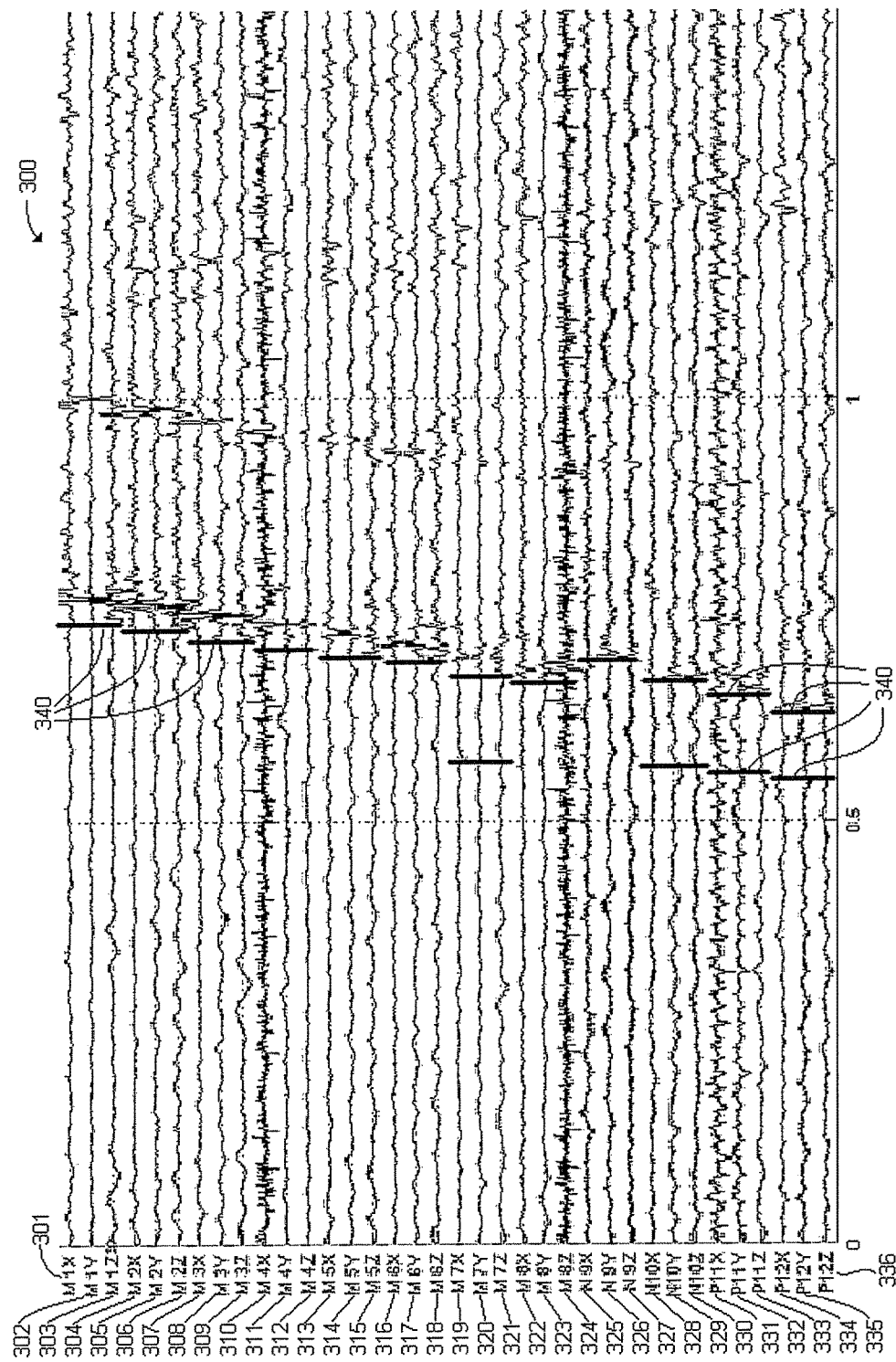
FIG. 3 depicts a plurality of traces for a seismic monitoring system.

Referring to FIG. 3, the traces may be plotted graphically in a display 300 as traces 301-336, so that the arrival times of different waves or waveforms may be identified. This identification process is called "picking," and the wave arrival times identified are called "picks." Examples of picks are shown in FIG. 3 as picks 340.

FIG. 3 shows an example of a set of traces generated from an exemplary network shown in FIG. 1. In this example, each receiver 111-122 represents a location that generates three traces representing waves 110 traveling along the x-axis, y-axis and z-axis, respectively. Three exemplary wellbores 125, 130 135, denoted "N", "M" and P, respectively for purposes of FIG. 3, each include a sensor or receiver array. For example, wellbore 125 may be denoted wellbore "N", and includes two receiver locations "N9" and "N10". Locations "N9" and "N10" correspond to receivers 111 and 112, respectively. Furthermore, each location generates three traces corresponding to waves along the orthogonal x, y and z axes. Thus, as shown in FIG. 3, receiver 111 generates traces 325, 326 and 327, which are denoted "N9X", "N9Y" and "N9Z", respectively. Likewise, receiver 112 generates traces 328, 329 and 330, which are denoted "N10X", "N10Y" and "N10Z", respectively.

As used herein in describing exemplary embodiments, "Rn" corresponds to a specific receiver number in the plurality of receivers, at a given location at the surface or downhole in a wellbore, such as wellbore 125, 130, 135. For example, each of the receivers 111-122 may correspond to R1, R2, R3 . . . Rn, respectively. "Trace$_m$(t)" corresponds to each of a plurality of data points in a specific trace in a specific time window. "E$_{Rn}$(t)" corresponds to a trace generated by a receiver having a corresponding receiver number, which may be computed from multiple traces (trace$_m$(t)). In one embodiment, trace$_m$(t) and E$_{Rn}$(t) represent the amplitude or energy level of a waveform for each of the plurality of data points in the time window. "P$_{Rn}$(t)" corresponds to an extracted portion of the trace E$_{Rn}$(t). The naming and numbering conventions described herein are provided to illustrate the embodiments described herein. The naming and number convention provided is arbitrarily chosen, and is provided for explanation only.

Figure 4:
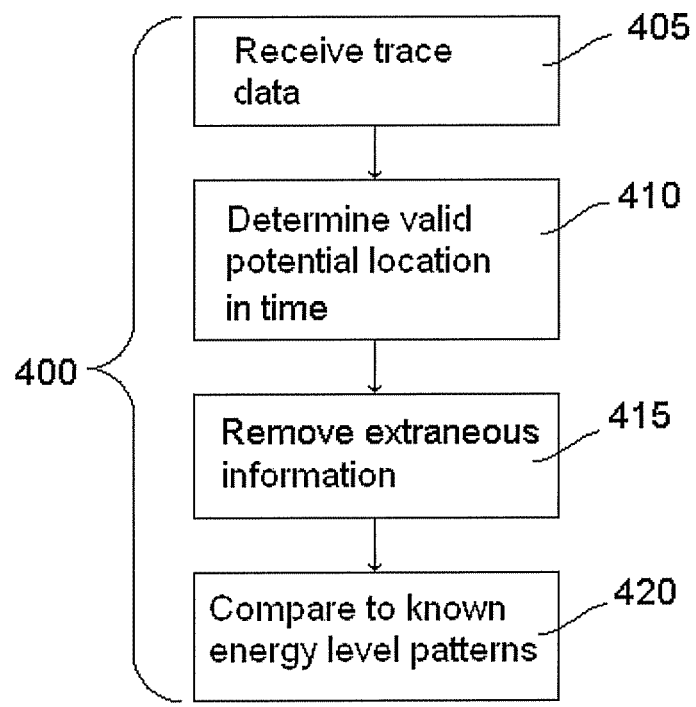
FIG. 4 is a flowchart illustrating exemplary aspects of a method of identifying a seismic event.

FIG. 4 illustrates a method 400 for monitoring seismic events and determining locations in time of seismic events, which may be utilized in, but is not limited to, microseismic passive monitoring. The method may include processing the traces (trace$_m$(t)) and/or the traces E$_{Rn}$(t) to validate the seismic signals, and removing extraneous information from the traces (trace$_m$(t)) to isolate and male distinct portions, referred to herein as "extracted portions", where the energy is high. The method 400 may also include comparing the extracted portion, hereinafter referred to as "P$_{Rn}$(t)", to one or more known energy level patterns, to determine a correlation between the extracted portion P$_{Rn}$(t) and the energy level pattern, identify the type of wave 110 and the corresponding seismic event, and to identify an arrival time of the wave 110. Ultimately, the system and method may provide picks 340 of the wave 110 arrival times or may identify for an operator suggestions of wave 110 arrival times in order to facilitate more rapid analysis of the data.

The method 400 includes one or more stages 405, 410, 415 and 420. The method 400 is described herein in conjunction with the plurality of receivers 111-122, although the method may be performed in conjunction with any number and configuration of receivers. The method 400 may be performed by the collection machine 200 and/or any other processor, which may be associated with the collection machine 200 and/or one or more of the plurality of receivers 111-122.

In the first stage 405, a trace data stream, or trace ($trace_m(t)$), from one or more of a plurality of the receivers 111-122 is obtained, such as by the collection machine 200 and/or the processor 215.

In the second stage 410, one or more of the traces ($trace_m(t)$) are processed, for example by the collection machine 200, for a potential event location in time to determine if a valid potential event occurred at that location.

In one embodiment, the second stage 410 involves the use of a wavelet transform to validate the potential event by recognizing an actual seismic event. A mother wavelet may be provided that has been extracted from a seismic signal recorded at the receiver location that corresponds to a known actual seismic or microseismic event. Wavelet processing allows the system to identify and/or classify seismic events.

Use of the wavelet transform allows for the discarding of signals that are not indicative of seismic events. Processing to validate the traces (e.g., based on the wavelet transform) allows for the discarding of traces representing known sources of noise, and thus reduces the risk of false alarm.

In one embodiment, the processing may include processing data from multiple receivers 111-122 in relation to a potential event location to determine whether the potential location is valid. For example, if an intermediate receiver 111-122 between the potential event location and the receiver did not detect an event, then there was no event at the potential event location. Either the event occurred at a different location or the event is the result of an error in the system.

In the third stage 415, extraneous information or data is removed from the trace ($trace_m(t)$), and a portion of the trace ($trace_m(t)$) and/or the resultant trace ($E_{Rn}(t)$) having strong energy is extracted. Such extraction may be used to filter out noise or other extraneous data and to focus on suspected seismic event data.

In one embodiment, the third stage 415 includes using a filter to eliminate data falling below a selected proportion of the maximum detected value for each trace ($trace_m(t)$). For example, the filter may be used to eliminate 99.9% of the maximum detected data value. This percentage may correspond approximately to the three (3) standard deviations (i.e., 3σ) of the data set provided in the trace ($trace_m(t)$). Any other suitable values may be used to filter out noise or other unwanted data.

In one embodiment, the filtered trace ($trace_m(t)$) may be normalized by any desired method known now or in the future. For example, normalization methods may include statistical analysis, data fitting, and data modeling. Examples of statistical analysis include calculation of a summation, an average, a variance, a standard deviation, t-distribution, a confidence interval, and others. Examples of data fitting include various regression methods, such as linear regression, least squares, segmented regression, hierarchal linear modeling, and others. Examples of data modeling include direct seismic modeling, indirect seismic modeling, and others. For example, a mean filter may be used to smooth the curves and to normalize the data values. In this manner, information regarding amplitude variation may be removed from the trace ($trace_m(t)$). In another embodiment, the data may be normalized by considering the maximum of all traces ($trace_m(t)$) generated from a receiver location.

In another embodiment, the third stage 415 includes extracting a portion of the data received from a receiver location having strong energy by stacking all channels (e.g., based on energy levels) and setting a threshold value. A "channel" may refer to a sensor or receiver in a receiver location that generates a single trace ($trace_m(t)$). For example, each of the filtered traces ($trace_m(t)$) from a receiver location may be stacked to produce the resultant trace $E_{Rn}(t)$. In one embodiment, the threshold value is a selected amplitude or energy level.

The resultant trace ($E_{Rn}(t)$), showing the energy levels of each trace from a receiver location in a selected time window may be calculated using the following equation (Equation 1):

$$E_{Rn}(t) = \Sigma[trace_m(t)^2] \quad (1)$$

where "$trace_m(t)$" is the amplitude of the wave 110 on each trace received from a respective channel associated with a receiver location.

For example, referring again to FIG. 3, each trace $E_{Rn}(t)$ is computed from multiple traces ($trace_m(t)$) from a location of a receiver 111-122. For example, a resultant trace $E_{Rn}(t)$ may be computed from traces 301, 302 and 303, which are traces representing waves 110 traveling along the x-axis, y-axis and z-axis, respectively. However, extraction may be performed on any resultant trace $E_{Rn}(t)$ or any individual trace ($trace_m(t)$). In one embodiment, for a receiver location generating a single trace ($trace_m(t)$), the single trace ($trace_m(t)$) and the resultant trace $E_{Rn}(t)$ may be equivalent.

The resultant trace $E_{Rn}(t)$ may be smoothed or otherwise normalized, for example with a Hilbert transform or a moon filter. As discussed above, normalization may be performed with any desired method known now or in the future, and may include methods such as statistical analysis, data fitting, and data modeling.

The resultant trace $E_{Rn}(t)$ may be compared to the threshold value, and portions of the resultant trace $E_{Rn}(t)$, hereinafter referred to as "$P_{Rn}(t)$", may be removed based on the threshold value. For example, portions of the resultant trace $E_{Rn}(t)$ having a value below the threshold value may be eliminated.

In the fourth stage 420, the extracted portion ($P_{Rn}(t)$) of the resultant trace $E_{Rn}(t)$, may be compared to one or more known energy level patterns, to identify the type of wave 110 detected by the receivers 111-122.

In one embodiment, the extracted portion ($P_{Rn}(t)$) may be compared to a width of the pattern desired to be matched to ensure that the width of the data extracted from the resultant trace $E_{Rn}(t)$ at least equals, but in one embodiment exceeds, the width of the pattern. A multiplier may be used to remedy any discrepancies in this regard.

Figure 5A:
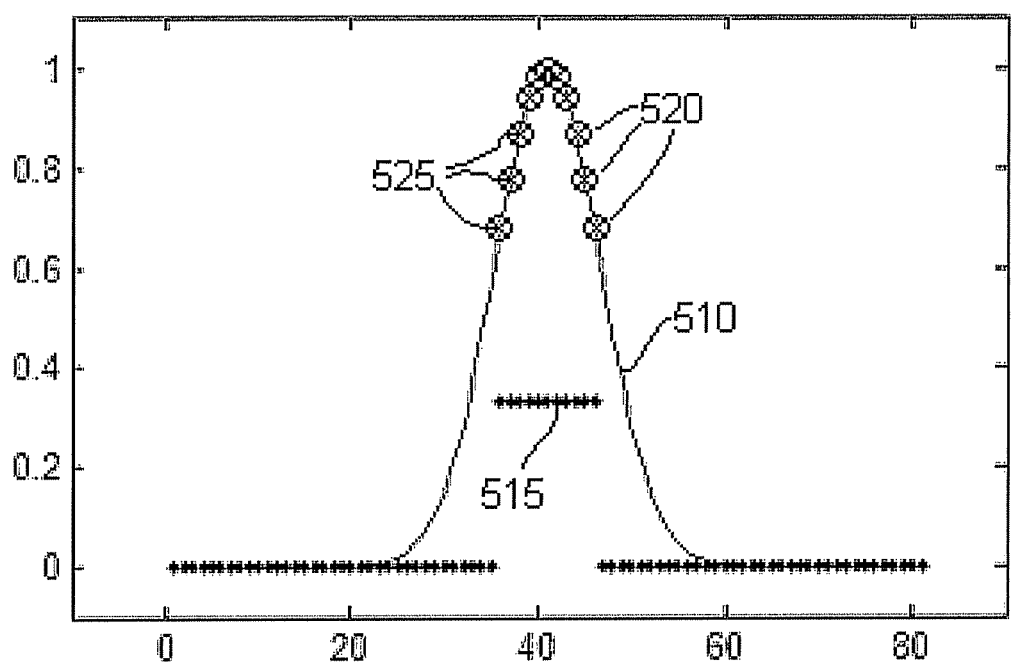
FIGS. 5A and 5B depict curve fit results for energy level plots.
Figure 5B:
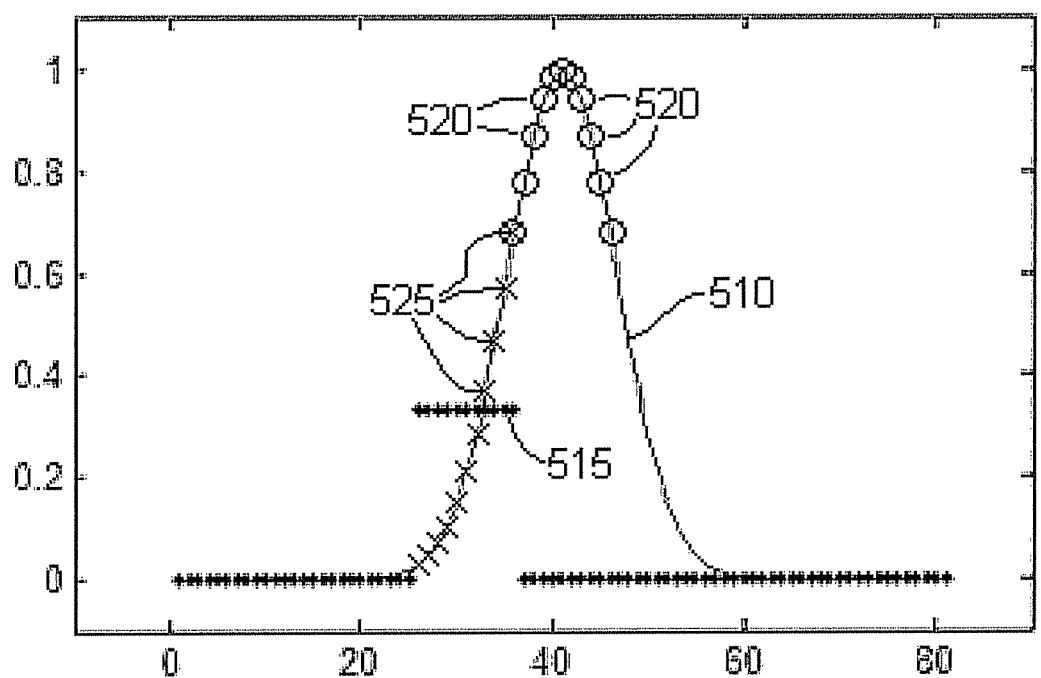

Referring to FIGS. 5A and 5B, the extracted portion ($P_{Rn}(t)$) may be compared to the pattern in order to locate the best coincidence between the pattern and the extracted portion ($P_{Rn}(t)$), i.e., the "best fit" or strongest correlation between the pattern and the extracted portion ($P_{Rn}(t)$), for each time shift of the pattern against the extracted portion ($P_{Rn}(t)$). FIGS. 5A and 5B illustrate an energy level plot 510 of the extracted portion ($P_{Rn}(t)$) and a plot of a pattern 515 for a selected time period. For example, FIG. 5A shows a first time shift of the pattern 515, and FIG. 5B shows a second time shift of the pattern 515.

As shown in FIGS. 5A and 5B, the pattern may be considered to have an arbitrary level. The total energy level of the extracted portion ($P_{Rn}(t)$) is shown by the energy level plot 510.

In one embodiment, a number of fit points 520 are chosen on the energy level plot 510 around the maximum energy level detected, indicated in this example by circles. In the embodiment shown in FIGS. 5A and 5B, eleven (11) fit points 520 are chosen, but any number of fit points 520 may be used, based on the precision desired, the size of the pattern width, and any other considerations.

One or more values 525 of the total energy of the plots is noted at one or more of the times within the pattern width, i.e., pattern time range, as indicated by the X's in FIGS. 5A and 5B. For each time shift being considered, a number of coincidences between the fit points 520 and the total energy values 525 for a time range within the pattern 515 may be determined. Determination of the number of coincidences may be repeated for each extracted portion ($P_{Rn}(t)$) generated from each receiver location.

In one embodiment, determination of the number of coincidences may be repeated for each total energy curve 510 of each extracted portion ($P_{Rn}(t)$) for a single time shift, and the total number of coincidences may be summed. This computation may be performed as to each extracted portion ($P_{Rn}(t)$) for a plurality of time shifts of the pattern versus the extracted portion ($P_{Rn}(t)$). In this regard, a total number of coincidences between a plurality of extracted portions ($P_{Rn}(t)$) and a particular time shifted pattern 515 may be determined.

In one embodiment, a "brute-force" method may be used to compare the pattern to the extracted portion ($P_{Rn}(t)$), namely that the fit, i.e., the number of coincidences, for each possible pattern time shift is considered. In an alternative embodiment, a median data point may first be fitted to the pattern, followed by the next earliest and next latest points, and so forth, so as to improve or optimize the comparison. Any other fitting methods or algorithms for determining a best fit between one or more traces and patterns may be used as well.

Once the comparisons are complete, the time shift showing the greatest number of fit point coincidences (i.e., matches), and thus having the strongest correlation with the extracted portion ($P_{Rn}(t)$), represents the best fit. The goodness of the fit may be characterized by the number of fit points matched. A strong correlation may be used to identify the extracted portion as corresponding to a seismic event represented by the pattern.

For example, the time shift shown in FIG. 5A, representing a potential seismic event arrival time, may represent the "best fit", as it shows a greater number of coincidences (eleven) than the time shift of FIG. 5B, which only shows one coincidence. Accordingly, the time range corresponding to the time shift of FIG. 5A, and the corresponding arrival time, may represent the arrival time of a wave resulting from a seismic event represented by the pattern.

Figure 6:
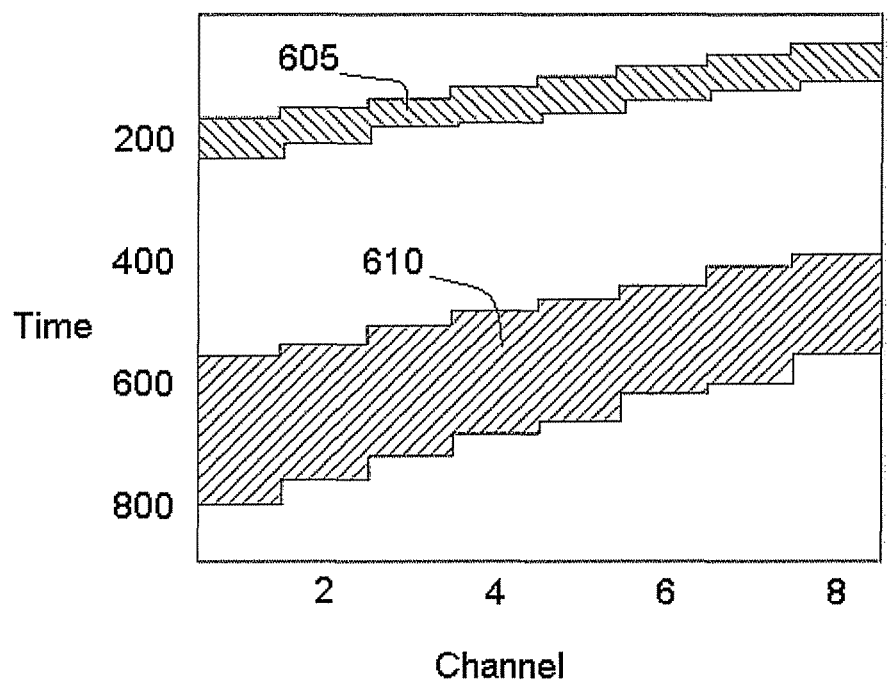
FIG. 6 depicts energy level patterns.

In one embodiment, a fit point threshold may be set to automatically flag a match only when a minimum number of fit points are matched. Alternatively, the number of fit points may be displayed, for example graphically or numerically, as a tool from which to draw in making picks. In another embodiment, the top several fits may be displayed for an operator to chose between the best fits or to male manual picks as to the data set. An example of such a display is shown in FIG. 6, which shows expected energy level patterns 605 and 610, where the x-axis corresponds to the channel or sensor number, and the y-axis corresponds to time. In one embodiment, time is expressed in time samples. For example, one sample may be equal to 1/"FE", where "FE" represents the sampling frequency of the signal. In one embodiment, patterns 605 and 610 may correspond to known or expected seismic events.

In another alternative embodiment, the patterns may be based on a data set that has already been manually picked and the pick locations noted. In such an embodiment, the system may automatically identify a fit to the pattern and place the pick locations on the data at a relative time identical to the pick to the pattern. The automatic picks may then be accepted as completed or manually reviewed for accuracy by an operator.

In one embodiment, the methodology described is performed in real time or near real time, so as to immediately (for example, within approximately 60 seconds) provide information as to the character or type of seismic events. In this embodiment, the results may be achieved quickly enough to modify a frac process, remove personnel from a dangerous area, or allow other interventions in time to save life, limb and property.

The systems and methods described herein provide various advantages over existing seismic monitoring systems. The systems and methods described herein facilitate identification of different types of waves, which may identify different types of seismic events. These systems and methods also facilitate identifying arrival times of such waves. Furthermore, the systems and methods may be utilized in real-time or near real-time, and thus allow for provision of identification information in a very timely manner, so that interventions may be undertaken immediately as suggested by the events.

In support of the teachings herein, various analysis components may be used, including digital and/or analog systems. The devices, systems and methods described herein may be implemented in software, firmware, hardware or any combination thereof. The devices may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the devices and methods disclosed herein in any of several manners well-appreciated in the art. It is considered that these teachings may be, but need not be, implemented in conjunction with a set of computer executable instructions stored on a computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure. The computer executable instructions may be included as part of a computer system or provided separately.

Further, various other components may be included and called upon for providing for aspects of the teachings herein. For example, a pump, piston, power supply (e.g., at least one of a generator, a remote supply and a battery), motive force (such as a translational force, propulsional force or a rotational force), magnet, electromagnet, sensor, electrode, transmitter, receiver, transceiver, antenna, controller, optical unit, electrical unit or electromechanical unit may be included in support of the various aspects discussed herein or in support of other functions beyond this disclosure.

One skilled in the art will recognize that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for identifying a seismic event, the method comprising:
   detecting a plurality of seismic data signals using a seismic monitoring system, each of the plurality of seismic data signals indicating energy levels;
   extracting by a processor an extracted portion of each of the plurality of seismic data signals based on a respective maximum energy level among the energy levels indicated by each of the plurality of seismic data signals, the extracted portion of each of the plurality of seismic data signals indicating an energy level, among the energy levels indicated by a respective one of the plurality of seismic data signals, equal to or greater than a selected proportion of the respective maximum energy level of the respective one of the plurality of seismic data signals;
   comparing the extracted portion of each of the plurality of seismic data signals to a known time pattern corresponding to a seismic event, and determining a correlation between the extracted portion of each of the plurality of seismic data signals and the known time pattern based on the comparing; and
   identifying the seismic event based on the correlation.

2. The method of claim 1, further comprising eliminating extraneous information from each of the plurality of seismic data signals.

3. The method of claim 2, wherein the eliminating comprises eliminating each energy level among the energy levels indicated by each of the plurality of seismic data signals that are below the selected proportion of the respective maximum energy level of each of the plurality of seismic data signals.

4. The method of claim 2, wherein the eliminating comprises eliminating each energy level among the energy levels indicated by each of the plurality of seismic data signals that are below 99.9% of the respective maximum energy level of each of the plurality of seismic data signals.

5. The method of claim 1, wherein the plurality of seismic data signals comprises real-time data.

6. The method of claim 1, further comprising wavelet processing the plurality of seismic data signals to validate a potential seismic event.

7. The method of claim 1, further comprising determining an arrival time of the seismic event from the correlation.

8. The method of claim 1, wherein the comparing comprises selecting at least one fit point on the extracted portion.

9. The method of claim 8, wherein the at least one fit point is selected based on a maximum value of the extracted portion.

10. The method of claim 8, wherein the comparing further comprises comparing at least one value of the extracted portion within a time period represented by the known time pattern with the at least one fit point, and determining a number of coincidences between the at least one value and the at least one fit point within the time period.

11. The method of claim 10, wherein comparing further comprises:
    time shifting the known time pattern,
    comparing the at least one value within a shifted time period with the at least one fit point,
    determining another number of coincidences between the at least one value and the at least one fit point within the shifted time period, and
    determining the correlation by comparing the number of coincidences and the another number of coincidences.

12. The method of claim 11, further comprising displaying at least one of: the number of coincidences, the another number of coincidences, and a time shift of the known time pattern having the greatest number of coincidences.

* * * * *